(12) United States Patent
Ghosh et al.

(10) Patent No.: US 10,380,121 B2
(45) Date of Patent: *Aug. 13, 2019

(54) SYSTEM AND METHOD FOR QUERY TEMPORALITY ANALYSIS

(71) Applicant: Apple Inc., Cupertino, CA (US)

(72) Inventors: Rishab Aiyer Ghosh, San Francisco, CA (US); Thomas James Emerson, Mountain View, CA (US); Lun Ted Cui, Fremont, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/520,872

(22) Filed: Oct. 22, 2014

(65) Prior Publication Data

US 2015/0169586 A1 Jun. 18, 2015

Related U.S. Application Data

(63) Continuation of application No. 13/161,143, filed on Jun. 15, 2011, now Pat. No. 8,892,541, which is a
(Continued)

(51) Int. Cl.
*G06F 16/2457* (2019.01)
*G06F 16/338* (2019.01)
*G06F 16/9535* (2019.01)

(52) U.S. Cl.
CPC ...... *G06F 16/24578* (2019.01); *G06F 16/338* (2019.01); *G06F 16/9535* (2019.01)

(58) Field of Classification Search
CPC ......... G06F 17/30696; G06F 17/30867; G06F 17/30864; G06F 17/3053; G06F 17/2217;
(Continued)

(56) References Cited

U.S. PATENT DOCUMENTS 5,430,839 A * 7/1995 Jagannathan ......... G06F 3/0481
715/790
6,151,585 A 11/2000 Altschuler et al.
(Continued)

FOREIGN PATENT DOCUMENTS

JP 2003288437 A 10/2003
WO WO2008/116516 A2 11/2006
(Continued)

OTHER PUBLICATIONS

Fan, et al., "Suggesting Topic-Based Query Terms as Your Type", 2010 12th International Asia-Pacific Web Conference (Apr. 2010).
(Continued)

*Primary Examiner* — Srirama Channavajjala
*Assistant Examiner* — Fariborz Khoshnoodi
(74) *Attorney, Agent, or Firm* — Womble Bond Dickinson (US) LLP

(57) ABSTRACT

A new approach is proposed that contemplates systems and methods to determine temporality of a query in order to generate a search result including a list of objects that are not only based on matching of the objects to the query but also based on temporality analysis of the query. Here, the temporality of the query can be defined as the distribution over time of the objects matching the query, i.e., the chronology histogram of the query. Such distribution can be analyzed to provide a classification of the intent of the query. Classification of the intent of the query can result either in discrete classification of the query into categories, or in continuous classification of the query which may be a scalar or vector value resulting from transformations of the chronology histogram.

53 Claims, 3 Drawing Sheets

Related U.S. Application Data continuation-in-part of application No. 12/895,593, filed on Sep. 30, 2010, now Pat. No. 7,991,725, which is a continuation-in-part of application No. 12/628,791, filed on Dec. 1, 2009, now Pat. No. 8,688,701, which is a continuation-in-part of application No. 12/628,801, filed on Dec. 1, 2009, now Pat. No. 8,244,664.

(60) Provisional application No. 61/355,443, filed on Jun. 16, 2010.

(58) Field of Classification Search
CPC ........... G06F 17/3061; G06F 17/30637; G06F 17/30899; G06F 17/30247; G06F 17/30876; G06F 17/30047; G06F 17/30011; G06F 17/30241; G06F 17/30253; G06F 16/587; G06F 16/955; G06F 16/24578; G06F 16/338; G06F 16/9535; G06F 16/434; G06F 16/93; G06F 16/29; G06F 16/5846
USPC .................................................. 707/706, 709
See application file for complete search history.

(56) References Cited

U.S. PATENT DOCUMENTS

| | | |
|---|---|---|
| 6,286,005 B1 | 9/2001 | Cannon |
| 7,512,612 B1 | 3/2009 | Akella et al. |
| 7,636,714 B1 | 12/2009 | Lamping et al. |
| 7,761,475 B2* | 7/2010 | Miller .................... G06F 16/289 707/802 |
| 7,849,076 B2* | 12/2010 | Zheng ................ G06F 17/30675 707/715 |
| 7,885,844 B1 | 2/2011 | Cohen et al. |
| 8,086,605 B2 | 12/2011 | Xu et al. |
| 8,145,656 B2* | 3/2012 | Shatz .................. G06K 9/00711 707/758 |
| 8,166,026 B1 | 4/2012 | Sadler |
| 8,166,925 B2 | 4/2012 | Suggett |
| 8,176,032 B2* | 5/2012 | Shen ................... G06F 17/30643 707/706 |
| 8,266,009 B1* | 9/2012 | Devlin .................... G06Q 40/00 705/26.3 |
| 8,352,549 B2 | 1/2013 | Sacco et al. |
| 8,572,173 B2 | 10/2013 | Briere et al. |
| 8,804,757 B2* | 8/2014 | Lu .......................... H04N 19/43 370/465 |
| 2002/0065959 A1* | 5/2002 | Kim ...................... G06K 9/6297 710/1 |
| 2003/0033296 A1* | 2/2003 | Rothmuller et al. ............ 707/3 |
| 2003/0110056 A1 | 6/2003 | Berghofer et al. |
| 2003/0229531 A1 | 12/2003 | Heckerman et al. |
| 2004/0001160 A1* | 1/2004 | Herley ................... H04H 60/56 348/465 |
| 2004/0177319 A1* | 9/2004 | Horn .................... G06F 17/3002 715/205 |
| 2004/0225592 A1 | 11/2004 | Churquina |
| 2005/0060312 A1 | 3/2005 | Curtiss et al. |
| 2005/0131897 A1 | 6/2005 | Grasso et al. |
| 2005/0154690 A1* | 7/2005 | Nitta et al. ...................... 706/46 |
| 2005/0192957 A1 | 9/2005 | Newbold |
| 2005/0256866 A1 | 11/2005 | Lu et al. |
| 2006/0041543 A1 | 2/2006 | Achlioptas |
| 2006/0059055 A1 | 3/2006 | Lin |
| 2006/0074836 A1 | 4/2006 | Gardner et al. |
| 2006/0112111 A1 | 5/2006 | Tseng et al. |
| 2006/0112146 A1 | 5/2006 | Song et al. |
| 2006/0218577 A1 | 9/2006 | Goodman et al. |
| 2006/0248073 A1* | 11/2006 | Jones et al. ...................... 707/5 |
| 2006/0294085 A1 | 12/2006 | Rose et al. |
| 2006/0294086 A1 | 12/2006 | Rose et al. |
| 2006/0294134 A1 | 12/2006 | Berkhim et al. |
| 2007/0027744 A1 | 2/2007 | Carson et al. |
| 2007/0078699 A1 | 5/2007 | Scott et al. |
| 2007/0121843 A1 | 5/2007 | Atazky et al. |
| 2007/0124432 A1 | 5/2007 | Holtzman et al. |
| 2007/0150398 A1 | 6/2007 | Rossan et al. |
| 2007/0156636 A1 | 7/2007 | Norton et al. |
| 2007/0168533 A1 | 7/2007 | Canright et al. |
| 2007/0208613 A1 | 9/2007 | Backer |
| 2007/0219863 A1 | 9/2007 | Park et al. |
| 2007/0226248 A1 | 9/2007 | Darr |
| 2007/0282867 A1 | 12/2007 | Mcallister et al. |
| 2007/0297405 A1 | 12/2007 | He |
| 2008/0004942 A1 | 1/2008 | Calabria |
| 2008/0010253 A1 | 1/2008 | Sidhu et al. |
| 2008/0059466 A1 | 3/2008 | Luo et al. |
| 2008/0104225 A1 | 5/2008 | Zhang et al. |
| 2008/0133426 A1 | 6/2008 | Porat et al. |
| 2008/0215429 A1 | 9/2008 | Ramer et al. |
| 2008/0215557 A1 | 9/2008 | Ramer et al. |
| 2008/0215571 A1 | 9/2008 | Huang et al. |
| 2008/0275833 A1 | 11/2008 | Zhou et al. |
| 2008/0288305 A1 | 11/2008 | LaLuzerne et al. |
| 2008/0288596 A1 | 11/2008 | Smith et al. |
| 2008/0313011 A1 | 12/2008 | Rose et al. |
| 2009/0043581 A1* | 2/2009 | Abbott ................... G10L 15/187 704/254 |
| 2009/0049038 A1 | 2/2009 | Gross |
| 2009/0049308 A1 | 2/2009 | Gross |
| 2009/0106224 A1 | 4/2009 | Roulland et al. |
| 2009/0106244 A1 | 4/2009 | Dash et al. |
| 2009/0119173 A1 | 5/2009 | Parsons et al. |
| 2009/0228397 A1* | 9/2009 | Tawakol ............. G06Q 30/0601 705/80 |
| 2009/0234828 A1 | 9/2009 | Pel-Hsuan |
| 2009/0240647 A1 | 9/2009 | Green et al. |
| 2009/0240691 A1* | 9/2009 | Yano ................. G06F 17/30867 |
| 2009/0275850 A1* | 11/2009 | Mehendale ........ A61B 5/04525 600/523 |
| 2009/0276500 A1 | 11/2009 | Karmarkar |
| 2009/0319342 A1 | 12/2009 | Shilman et al. |
| 2010/0058196 A1 | 3/2010 | Krishnan et al. |
| 2010/0070448 A1 | 3/2010 | Omoigui |
| 2010/0100537 A1 | 4/2010 | Druzgalski et al. |
| 2010/0119053 A1 | 5/2010 | Goeldi |
| 2010/0121617 A1 | 5/2010 | Meyer |
| 2010/0121839 A1 | 5/2010 | Meyer |
| 2010/0174692 A1 | 7/2010 | Meyer |
| 2010/0306192 A1 | 12/2010 | Kapur et al. |
| 2010/0332495 A1* | 12/2010 | Richter ............. G06F 17/30551 707/759 |
| 2011/0004465 A1 | 1/2011 | Rose et al. |
| 2011/0022602 A1 | 1/2011 | Luo et al. |
| 2011/0078156 A1 | 3/2011 | Koss |
| 2011/0093459 A1 | 4/2011 | Dong et al. |
| 2011/0191372 A1 | 8/2011 | Kaushansky et al. |
| 2011/0212717 A1 | 9/2011 | Rhoads et al. |
| 2012/0078894 A1* | 3/2012 | Jiang ................. G06F 17/30743 707/723 |
| 2012/0166438 A1 | 6/2012 | Wu et al. |
| 2013/0304818 A1* | 11/2013 | Brumleve ............... H04L 67/02 709/204 |

FOREIGN PATENT DOCUMENTS

| | | |
|---|---|---|
| WO | WO2006/006059 A2 | 1/2008 |
| WO | WO-2006073977 A1 | 7/2008 |

OTHER PUBLICATIONS

Guha, R., Kumer, R, Raghavan, P., and Tomkins, A. 2004, Propagation of trust and distrust, In Proceedings of the 13th International Conference on World Wide Web (New York, NY, USA, May 17-20, 2004). WWW '04, ACM, New York, NY, pp. 403-412.

Ziegler, C. and Lauson, G. 2005, Propagation Models for Trust and Distrust in Social Networks, Information Systems Frontiers 7, 4-5 (Dec. 2005), 337-358.

(56) References Cited

OTHER PUBLICATIONS

Makkonen et al., Topic Detection and Tracking with Spatio-Temporal Evidence, published Spring 2003.

Lu et al., "Finding Query Suggestions for PubMed", 2009, AMIA.

Tao, Yufei et al: "Selectivity Estimation of Predictive Spatio-Temporal Queries", Proceedings 19th International Conference on Data Engineering (ICDE'2003). Bangladore, India, Mar. 5-8, 2003: pp. 417-428.

Dai, Na et al: "Mining Anchor Text Trends for Retrieval" Mar. 28, 2010; pp. 127-139.

Ashkan, Azin et al: "Classifying and Characterizing Quely Intent", Apr. 6, 2009, pp. 578-588.

Garfield, E.: "Citation, Analysis as a Tool in Journal Evaluation", 1972, pp. 527-544, XP002381248.

Johnson, Caleb: "Likebutton.me Reveals What Your Friends 'Like' Across the Web": Apr. 26, 2010, pp. 1-7: XP000002856471.

Anonymous: "H-Index", Wikipedia, Internet Article, Jun. 10, 2010; pp. 1-3; XP000002656472.

Dietz, Laura et al: "Unsupervised Prediction of Citation Influences", Proceedings of the 24th International Conference on Machine Learning, Jun. 20, 2007; pp. 233-240; XP55004362.

Huang, Jeff et al: "Conversational Tagging in Twitter", Proceedings of the 21st ACM Conference on Hypertext and Hypermedia; Jun. 13, 2010: p. 173; XP55004356.

Page, L. et al: "The PageRank Citation Ranking: Bringing Order to the Web", Internal Citation; Jan. 29, 1998; XP002213518.

Liu, "Co-authorship networks in the digital library research community", 2005, Elsevier, Information Processing and Management 41 (2005) pp. 1462-1480.

Von Der Weth, "Towards an objective assessment of centrality measures in reputation systems", 2007, IEEE, 0-7695-2913.

Zhou, "Powertrust: A robust and scalable repuation system for trusted peer-to-peer computing", 2007, IEEE, 1-45-921907.

Massa, Paolo et al: "Using Trust in Recommender Systems: An Experimental Analysis"; Feb. 26, 2004; pp. 221-235; section 1.1; pp. 222-223, sections 1.3 and 2; pp. 225-227.

PCT International Search Report for PCT/US2011/040635, dated Sep. 6, 2011.

PCT Written Opinion of the International Search Authority for PCT/US2011/040635 dated Sep. 6, 2011.

PCT International Preliminary Report on Patentability dated Dec. 19, 2012 for PCT/US2011/040635.

* cited by examiner ved Europe for 5 years).# SYSTEM AND METHOD FOR QUERY TEMPORALITY ANALYSIS

RELATED APPLICATIONS

This application is a continuation of co-pending U.S. application Ser. No. 13/161,143 filed on Jun. 15, 2011, which claims priority to U.S. Provisional Patent Application No. 61/355,443, filed Jun. 16, 2010, and entitled "A system and method for query temporality analysis," and is hereby incorporated herein by reference. U.S. patent application Ser. No. 13/161,143 is also a continuation-in-part of prior U.S. application Ser. No. 12/895,593 filed Sep. 30, 2010, now issued as U.S. Pat. No. 7,991,725. U.S. patent application Ser. No. 13/161,143 is also a continuation-in-part of U.S. patent application Ser. No. 12/628,791 filed Dec. 1, 2009, now issued as U.S. Pat. No. 8,688,701. U.S. patent application Ser. No. 13/161,143 is also a continuation-in-part of U.S. Application Ser. No. 12/628,801 filed Dec. 1, 2009, now issued as U.S. Pat. No. 8,244,664.

BACKGROUND

Knowledge is increasingly more germane to our exponentially expanding information-based society. Perfect knowledge is the ideal that participants seek to assist in decision making and for determining preferences, affinities, and dislikes. Practically, perfect knowledge about a given topic is virtually impossible to obtain unless the inquirer is the source of all of information about such topic (e.g., autobiographer). Armed with more information, decision makers are generally best positioned to select a choice that will lead to a desired outcome/result (e.g., which restaurant to go to for dinner). However, as more information is becoming readily available through various electronic communications modalities (e.g., the Internet), one is left to sift through what is amounting to a myriad of data to obtain relevant and, more importantly, trust worthy information to assist in decision making activities. Although there are various tools (e.g., search engines, community boards with various ratings), there lacks any indicia of personal trustworthiness (e.g., measure of the source's reputation and/or influence) with located data.

Currently, a person seeking to locate information to assist in a decision, to determine an affinity, and/or identify a dislike can leverage traditional non-electronic data sources (e.g., personal recommendations—which can be few and can be biased) and/or electronic data sources such as web sites, bulletin boards, biogs, and other sources to locate (sometimes rated) data about a particular topic/subject (e.g., where to stay when visiting San Francisco). Such an approach is time consuming and often unreliable as with most of the electronic data there lacks an indicia of trustworthiness of the source of the information. Failing to find a plethora (or spot on) information from immediate non-electronic and/or electronic data source(s), the person making the inquiry is left to make the decision using limited information, which can lead to less than perfect predictions of outcomes, results, and can lead to low levels of satisfaction undertaking one or more activities for which information was sought.

Current practices also do not leverage trustworthiness of information or, stated differently, attribute a value to the influence of the source of data (e.g., referral). With current practices, the entity seeking the data must make a value judgment on the influence of the data source. Such value judgment is generally based on previous experiences with the data source (e.g., rely on Mike's restaurant recommendations as he is a chef and Laura's hotel recommendations in Europe as she lived and worked in Europe for 5 years). Unless the person making the inquiry has an extensive network of references from which to rely to obtain desired data needed to make a decision, most often, the person making the decision is left to take a risk or "roll the dice" based on best available non-attributed (non-reputed) data. Such a prospect often leads certain participants from not engaging in a contemplated activity. Influence accrued by persons in such a network of references is subjective. In other words, influence accrued by persons in such a network of references appear differently to each other person in the network, as each person's opinion is formed by their own individual networks of trust.

Real world trust networks follow a small-world pattern, that is, where everyone is not connected to everyone else directly, but most people are connected to most other people through a relatively small number of intermediaries or "connectors". Accordingly, this means that some individuals within the network may disproportionately influence the opinion held by other individuals. In other words, some people's opinions may be more influential than other people's opinions.

As referred to herein, influence is provided for augmenting reputation, which may be subjective. In some embodiments, influence is provided as an objective measure. For example, influence can be useful in filtering opinions, information, and data. It will be appreciated that reputation and influence provide unique advantages in accordance with some embodiments for the ranking of individuals or products or services of any type in any means or form.

One issue facing an online user is the difficulty to search for content that actually addresses his/her problem from his/her own perspective or from someone whose opinion the user values highly. Even when the user is able to find the content that is relevant to address his/her problem, such content is most likely to be of "time neutral" type that does not categorize the search results based on their timing.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to determine temporality of a query in order to generate a search result including a list of objects that are not only based on matching of the objects to the query but also based on temporality analysis of the query. Here, the temporality of the query can be defined as the distribution over time of the objects matching the query, i.e., the chronology histogram of the query. Such distribution can be analyzed to provide a classification of the intent of the query. For non-limiting examples, a query with constant/even distribution of objects over time is most likely intended for knowledge or canonical, while a query with distribution of objects concentrated at particular points is most likely focused on a specific event, and a query with distribution of objects increased over time mainly reflects the recent interest of a user. Classification of the intent of the query can result either in discrete classification of the query into categories as shown by the non-limiting examples above, or in continuous classification of the query which may be a scalar or vector value resulting from transformations of the chronology histogram. Such classification of the query can be directly communicated to the user or be utilized to perform further operations, which include but are not limited to, choosing different forms of displaying the search result to the user, choosing different methods to determine the search result, and as an input to the search result computation.

Citation Graph

Figure 1:
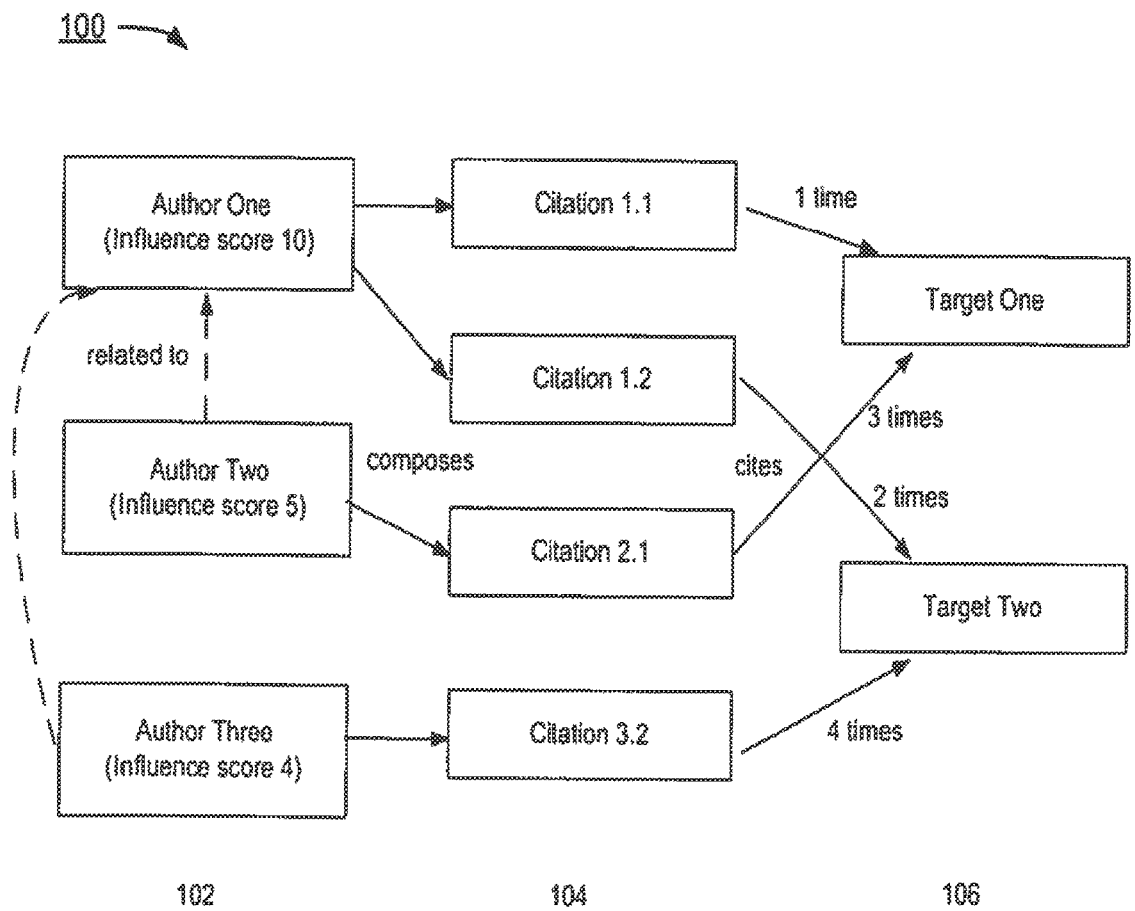
FIG. 1 depicts an example of a citation graph used to support citation search.

An illustrative implementation of systems and methods described herein in accordance with some embodiments includes a citation graph 100 as shown in FIG. 1. In the example of FIG. 1, the citation graph 100 comprises a plurality of citations 104, each describing an opinion of the object by a source/subject 102. The nodes/entitles in the citation graph 100 are characterized into two categories, 1) subjects 102 capable of having an opinion or creating/making citations 104, in which expression of such opinion is explicit, expressed, Implicit, or imputed through any other technique; and 2) objects 106 cited by citations 104, about which subjects 102 have opinions or make citations. Each subject 102 or object 106 in graph 100 represents an influential entity, once an influence score for that node has been determined or estimated. More specifically, each subject 102 may have an influence score indicating the degree to which the subject's opinion influences other subjects and/or a community of subjects, and each object 106 may have an influence score indicating the collective opinions of the plurality of subjects 102 citing the object.

In some embodiments, subjects 102 representing any entities or sources that make citations may correspond to one or more of the following:
  Representations of a person, web log, and entities representing Internet authors or users of social media services including one or more of the following: blogs, Twitter, or reviews on Internet web sites;
  Users of microblogging services such as Twitter;
  Users of social networks such as MySpace or Facebook, bloggers;
  Reviewers, who provide expressions of opinion, reviews, or other information useful for the estimation of influence.

In some embodiments, some subjects/authors 102 who create the citations 104 can be related to each other, for a non-limiting example, via an influence network or community and influence scores can be assigned to the subjects 102 based on their authorities in the influence network.

In some embodiments, objects 106 cited by the citations 104 may correspond to one or more of the following: Internet web sites, blogs, videos, books, films, music, image, video, documents, data files, objects for sale, objects that are reviewed or recommended or cited, subjects/authors, natural or legal persons, citations, or any entities that are or may be associated with a Uniform Resource identifier (URI), or any form of product or service or information of any means or form for which a representation has been made.

In some embodiments, the links or edges 104 of the citation graph 100 represent different forms of association between the subject nodes 102 and the object nodes 106, such as citations 104 of objects 106 by subjects 102. For non-limiting examples, citations 104 can be created by authors citing targets at some point of time and can be one of ink, description, keyword or phrase by a source/subject 102 pointing to a target (subject 102 or object 106). Here, citations may include one or more of the expression of opinions on objects, expressions of authors in the form of Tweets, blog posts, reviews of objects on Internet web sites Wikipedia entries, postings to social media such as Twitter or Jaiku, postings to websites, postings in the form of reviews, recommendations, or any other form of citation made to mailing lists, newsgroups, discussion forums, comments to websites or any other form of Internet publication.

In some embodiments, citations 104 can be made by one subject 102 regarding an object 106, such as a recommendation of a website, or a restaurant review, and can be treated as representation an expression of opinion or description. In some embodiments, citations 104 can be made by one subject 102 regarding another subject 102, such as a recommendation of one author by another, and can be treated as representing an expression of trustworthiness. In some embodiments, citations 104 can be made by certain object 106 regarding other objects, wherein the object 106 is also a subject.

In some embodiments, citation 104 can be described in the format of (subject, citation description, object, timestamp, type). Citations 104 can be categorized into various types based on the characteristics of subjects/authors 102, objects/targets 106 and citations 104 themselves. Citations 104 can also reference other citations. The reference relationship among citations is one of the data sources for discovering influence network.

Figure 2:
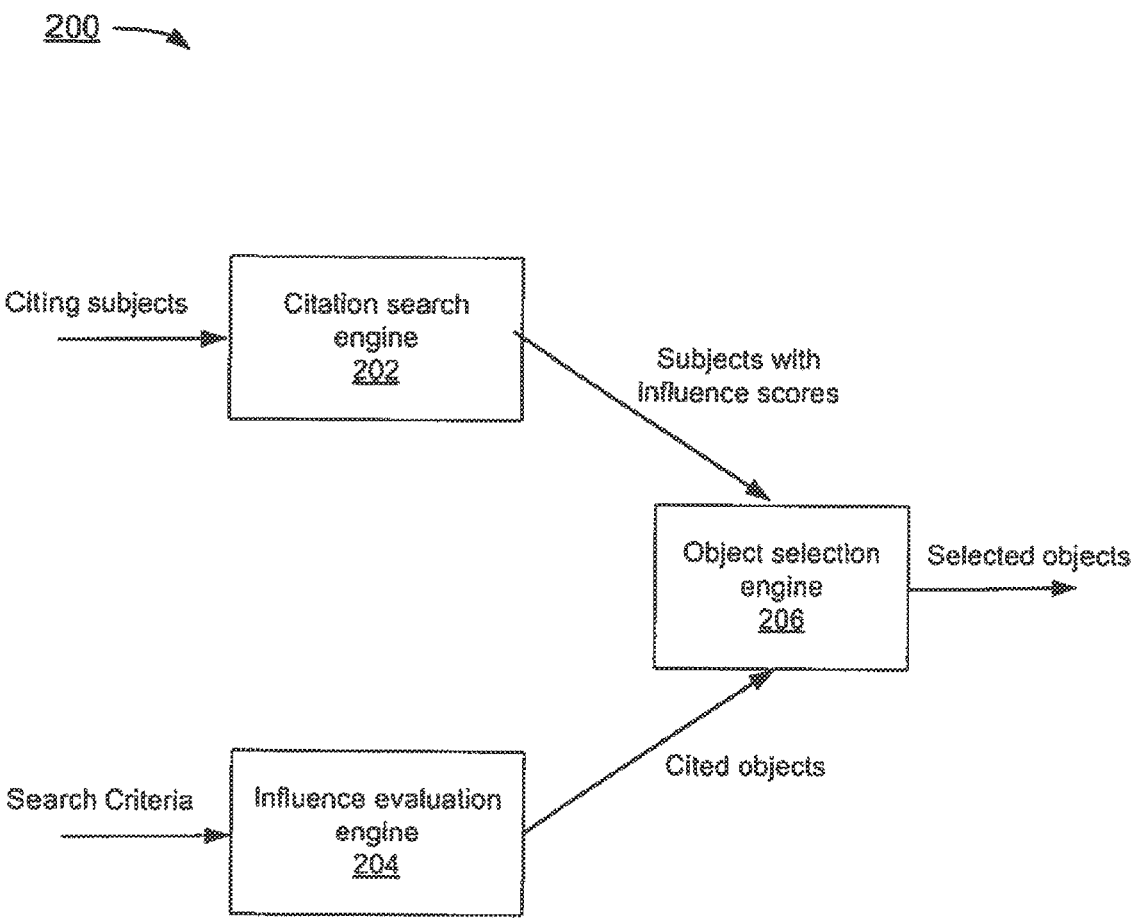
FIG. 2 depicts an example of a system diagram to support query temporality analysis.

FIG. 2 depicts an example of a system diagram to support determination of quality of cited objects in search results based on the influence of the citing subjects. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 2, the system 200 includes at least search engine 204, influence evaluation engine 204, and object selection engine 206. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 2, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod, an IPhone, an iPad, Google's Android device, a PDA, or a server machine. A storage device can be but is not limited to a hard disk drive, a flash memory drive, or any portable storage device. A communication device can be but is not limited to a mobile phone.

In the example of FIG. 2, search engine 202, influence evaluation engine 204, and object selection engine 206 each has a communication interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth, WIFI, and mobile communication network. The physical connections of the network and the communication protocols are well known to those of skill in the art.

Temporality Analysis

Figure 3:
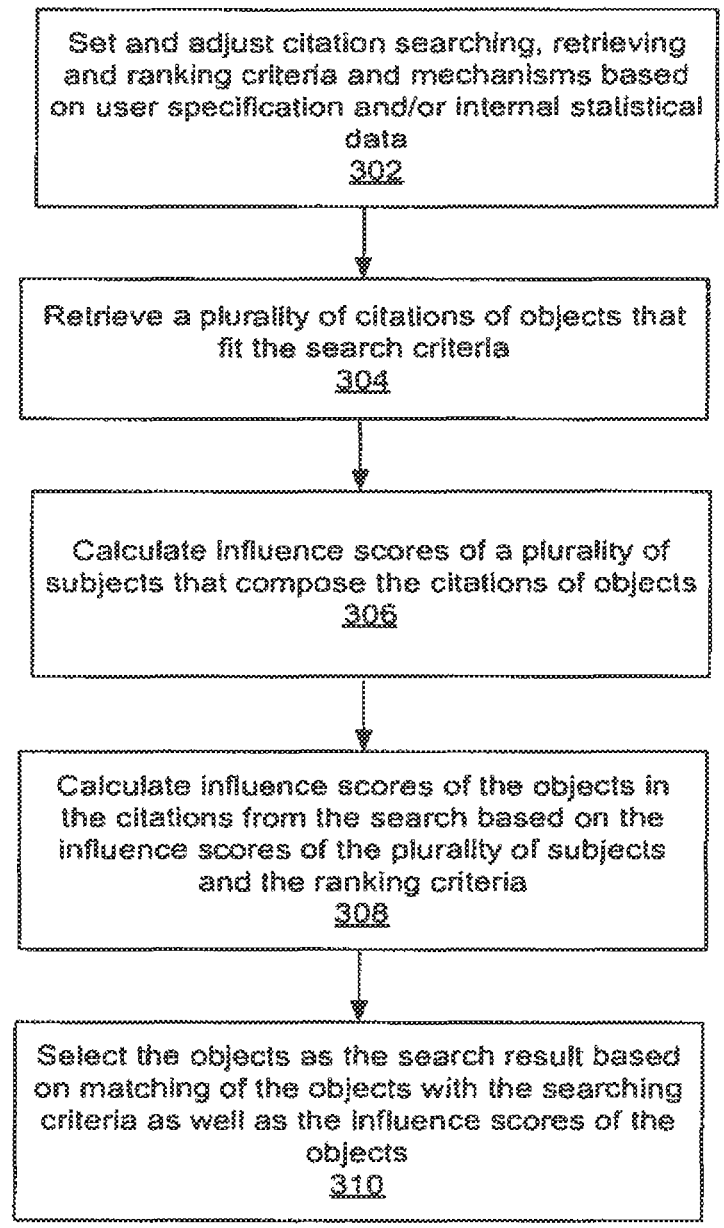
FIG. 3 depicts an example of a flowchart of a process to support query temporality analysis.

In the example of FIG. 2, search engine 202 accepts a search request in the form of a query from a user and determines temporality of a query in order to generate a search result including a plurality of objects 106 that are not only based on matching of the objects to the query but also based on temporality analysis of the query. FIG. 3 depicts an example of a flowchart of a process to support query temporality analysis. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where a query is accepted from a user as part of a search request. The flowchart 300 continues to block 304 where a plurality of objects that match the query are retrieved. The flowchart 300 continues to block 306 where distribution over time of the objects (known as a chronology histogram) matching the query is determined for temporality analysis of the query based on timestamp metadata associated with the objects. The flowchart 300 continues to block 308 where the distribution over time of the objects is analyzed to provide a classification of the intent of the query. The flowchart 300 ends at block 310 where a search result including the objects is generated that is not only based on matching of the objects to the query but also based on the classification of the intent of the query.

In some embodiments, the search engine 202 provides a discrete classification of the intent of the query into various categories, wherein a query with constant/even distribution of objects over time is most likely intended for knowledge/canonical and may be classified by the search engine 202 as such, while the query with distribution of the objects concentrated at particular points is most likely focused on a specific event, and a query with distribution of the objects increased over time mainly reflects the recent interest of a user. Alternatively, the search engine 202 provides a continuous classification of the intent of the query, which can be but is not limited to a scalar or vector value resulting from transformations of a chronology histogram of the query, which represents the distribution over time of the objects matching the query.

In some embodiments, the search engine 202 may utilize the temporality analysis of the query, among other criteria and/or factors, to select a "time window" that provides the best search result for a specific query. Here, the time window can be but is not limited to one of: hour (the preceding/past 60 minutes), day (the preceding 24 hours), week (the preceding 7 days), month (the preceding 30 days), or all (results from as far back as they have been collected). However, if only one of these windows can be pre-selected and displayed on the results page as the search result at a given time, the purpose of the time window selection is to choose the proper time window (H, D, W, M, or A) to be displayed. In some embodiments, the search engine 202 may select a combination of multiple time windows so that the search result may include, for a non-limiting example, mostly canonical objects with a few recent objects.

In some embodiments, among a given set of time windows, such as the past hour, day, week, month and "all-time", the search engine 202 may select the best time window based on the time distribution of the objects matching the query, i.e., the ratio of the actual count of objects (object count) during that time window to the expected object count for that time window for that specific query so that the temporality of the search result best matches that of the query. Here, the search engine 202 may compute the expected object count for a time window based on actual object counts for the preceding and succeeding time windows, including place-holder time windows that may never be selected but are used for computation purposes only. The expected object count for a time window can be based on the actual time (including the time of day, or time of week) in which the query takes place. The search engine 202 may weight the ratio of expected to actual object count may be weighted to provide a bias for certain time windows (e.g. day preferred to month). Such time window selection process is based on the assumption that a time window is likely to be of most interest to the user if there are more objects from that window in the search result than would otherwise be expected proportionately from the number of objects in the preceding (next earliest) or following (next latest) windows. For a non-limiting example, a term currently having 835 matching objects in the week window should have a proportionate number of 835/7=119 in the day window. If in fact the day window has 472 objects, far in excess of the number 119 that would have been expected based on the week window, the day window is likely to be of most interest to the user and that is the window whose matching objects should be displayed as the search result.

Citation Search

In some embodiments, search engine 202 enables a citation search process, which unlike the "classical web search" approaches that is object/target-centric and focuses only on the relevance of the objects 106 to the searching criteria, the search process adopted by search engine 202 is "citation" centric, retrieving a plurality of citations composed by a plurality of subjects citing a plurality of objects. In addition, the classical web search retrieves and ranks objects 106 based on attributes of the objects, while the proposed search approach adds citation 104 and subject/author 102 dimensions. The extra metadata associated with subjects 102, citations 104, and objects 106 provide better ranking capability, richer functionality and higher efficiency for the searches.

In some embodiments, the search engine 202 may accept and enforce various criteria/terms on citation searching, retrieving and ranking, each of which can either be explicitly described by a user or best guessed by the system based on internal statistical data. Such criteria include but are not limited to, a) Constraints for the citations, including but are not limited to,
   Description: usually the text search query;
   Time range of the citations;
   Author: such as from particular author or sub set of authors;
   Type: types of citations;
b) Types of the cited objects: the output can be objects, authors or citations of the types including but are not limited to,
   Target types: such as web pages, images, videos, people
   Author types: such as expert for certain topic
   Citation types: such as tweets, comments, blog entries
c) Ranking bias of the cited objects: which can be smartly guessed by the system or specified by user including but are not limited to,
   Time bias: recent; point of time; event; general knowledge; auto
   View point bias: such as general view or perspective of certain people.
   Type bias: topic type, target type.

In the example of FIG. 2, object selection engine 206 determines temporalities and classifications of one or more of citing subjects/sources and cited objects/targets of the citations in addition to temporality and classification of the query in order to provide a list of selected objects based on one or more of these temporalities. More specifically, the object selection engine 206 may select and rank the objects in part according to one or more of:
   How closely the temporality of the objects fits particular temporality classifications, which may be discrete, such as "knowledge" or continuous scalar or vector temporality classifications;
   How closely the temporality of the objects fits the temporality of the query;
   How closely the temporality of the sources of each citation for each object fits particular temporalities, such as a pre-defined temporality or the temporality of the query;
   How closely the temporality of these subjects fits particular temporalities, such as a pre-defined temporality or the temporality of the query.

Similar to temporality analysis of a query, the object selection engine 206 may determine the temporality of a subject based on its chronology histogram. Here, the chronology histogram of the subject can either be query-dependent—time distribution of citations from the subject that matches a query, e.g. when the source "reuters" makes citations including the query term "nuclear", or query independent—time distribution of all of the citations from the subject, e.g., every time "reuters" makes a citation in any context.

In some embodiments, the object selection engine 206 may utilize the temporality analysis to identify whether the subjects of the citations (possibly about a particular topic or query term) are either evenly or concentratedly distributed over time. The object selection engine 206 may also utilize such temporality analysis to classify the subjects, where classification can result either in discrete classification of the subjects into categories, such as, for non-limiting examples, "regular sources" or "sporadic sources", or in continuous classification which may be a scalar or vector value resulting from transformations of the chronology histogram.

Similar to temporality analysis of a query, the object selection engine 206 may determine the temporality of an object on the basis of its chronology histogram. Here, the chronology histogram of the object can either be query-dependent—time distribution of citations for the object that matches a query, e.g. when the object "perl.org" is cited along with the query term "perl", or query independent—time distribution of all of the citations for the object, e.g., every time "perl.org" is cited in any context. For a non-limiting example, the object selection engine 206 may utilize such temporality analysis to identify whether the objects of the citations (possibly about a particular topic or query term) are either evenly or concentratedly distributed over time. The object selection engine 206 may also utilize such temporality analysis to classify the objects, where classification of the intent of the query can result in discrete classification of the objects into categories, such as, in non-limiting examples, "knowledge" or "event", or in continuous classification which may be a scalar or vector value resulting from transformations of the chronology histogram.

In some embodiments, the object selection engine 206 may limit the chronology histogram to:
   citations for which subjects have influence above a threshold;
   citations in specific languages;
   citations for targets in specific languages; to citations from sources in particular locations.

In the approaches outlined above, the object selection engine 206 may weigh the chronology histogram of a query, a subject or an object based on attributes associated with each citation, or attributes associated with the subject or object of each citation. Here, the attributes include but are not limited to language, location, source, and time (recency) of the citation or the subject or object of the citation. The attributes may be generated, computed, acquired or may be ascribed as metadata to the citation or the subject or object.

In some embodiments, the classifications of the query, the subject, and/or the object can be directly communicated to the user and the object selection engine 206 may utilize such classification to perform further operations that include but are not limited to, choosing different forms of displaying the search result to the user (e.g. highlighting "events" or "knowledge"), choosing different methods to determine the search result, and as an input to the search result computation.

Influence Evaluation

In the example of FIG. 2, influence evaluation engine 204 calculates influence scores of entities (subjects 102 and/or objects 106), wherein such influence scores can be used to determine at least in part, in combination with other methods and systems, the ranking of any subset of objects 106 obtained from a plurality of citations 104 from citation search results.

In some embodiments, influence evaluation engine 204 measures influence and reputation of subjects 102 that compose the plurality of citations 104 citing the plurality of objects 106 on dimensions that are related to, for non-limiting examples, one or more of the specific topic or objects (e.g., automobiles or restaurants) cited by the subjects, or form of citations (e.g., a weblog or Wikipedia entry or news article or Twitter feed), or search terms (e.g., key words or phrases specified in order to define a subset of all entities that match the search term(s)), in which a subset of the ranked entities are made available based on selection criteria, such as the rank, date or time, or geography/location associated with the entity, and/or any other selection criteria.

In some embodiments, influence evaluation engine 204 determines an influence score for a first subject or source at least partly based on how often a first subject is cited or referenced by a (another) second subject(s). Here, each of the first or the second subject can be but is not limited to an internet author or user of social media services, while each citation describes reference by the second subject to a citation of an object by the first subject. The number of the citations or the citation score of the first subject by the second subjects is computed and the influence of the second subjects citing the first subject can also be optionally taken into account in the citation score. For a non-limiting example, the influence score of the first subject is computed as a function of some or all of: the number of citations of the first subject by second subjects, a score for each such citation, and the influence score of the second subjects. Once computed, the influence of the first subject as reflected by the count of citations or citation score of the first subject or subject can be displayed to the user at a location associated with the first subject, such as the "profile page" of the first subject, together with a list of the second subjects citing the first subjects, which can be optionally ranked by the influences of the second subject.

In some embodiments, influence evaluation engine 204 allows for the attribution of influence on subjects 102 to data sources (e.g., sources of opinions, data, or referrals) to be estimated and distributed/propagated based on the citation graph 100. More specifically, an entity can be directly linked to any number of other entities on any number of dimensions in the citation graph 100, with each link possibly having an associated score. For a non-limiting example, a path on a given dimension between two entities, such as a subject 102 and an object 106, includes a directed or an undirected link from the source to an intermediate entity, prefixed to a directed or undirected path from the intermediate entity to the object 106 in the same or possibly a different dimension.

In some embodiments, influence evaluation engine 204 estimates the influence of each entity as the count of actual requests for data, opinion, or searches relating to or originating from other entities, entities with direct links to the entity or with a path in the citation graph, possibly with a predefined maximum length, to the entity; such actual requests being counted if they occur within a predefined period of time and result in the use of the paths originating from the entity (e.g., representing opinions, reviews, citations or other forms of expression) with or without the count being adjusted by the possible weights on each fink, the length of each path, and the level of each entity on each path.

In some embodiments, influence evaluation engine 204 adjusts the Influence of each entity by metrics relating to the citation graph comprising all entities or a subset of all linked entities. For a non-limiting example, such metrics can include the density of the graph, defined as the ratio of the number of links to the number of linked entities in the graph; such metrics are transformed by mathematical functions optimal to the topology of the graph, such as where it is known that the distribution of links among entities in a given graph may be non-linear. An example of such an adjustment would be the operation of estimating the influence of an entity as the number of directed links connecting to the entity, divided by the logarithm of the density of the citation graph comprising all linked entities. For example, such an operation can provide an optimal method of estimating influence rapidly with a limited degree of computational complexity.

In some embodiments, influence evaluation engine 204 optimizes the estimation of influence for different contexts and requirements of performance, memory, graph topology, number of entities, and/or any other context and/or requirement, by any combination of the operations described above in paragraphs above, and any similar operations involving metrics including but not limited to values comprising: the number of potential source entities to the entity for which influence is to be estimated, the number of potential target entities, the number of potential directed paths between any one entity and any other entity on any or all given dimensions, the number of potential directed paths that include the entity, the number of times within a defined period that a directed link from the entity is used for a scoring, search or other operation(s).

In some embodiments, object selection engine 206 utilizes influence scores of the citing subjects 102 and the number of their citations 104 to determine the selection and ranking of objects 106 cited by the citations, wherein the objects include but are not limited to documents on the Internet, products, services, data files, legal or natural persons, or any entities in any form or means that can be searched or cited over a network. Here, object selection engine 206 selects and ranks the cited objects based on ranking criteria that include but are not limited to, influence scores of the citing subjects, date or time, geographical location associated with the objects, and/or any other selection criteria.

In some embodiments, object selection engine 206 calculates and ranks the influence scores of the cited objects based on attributes of one or more of the following scoring components in combination with other attributes of objects including semantic or descriptive data regarding the objects:

Subjects of the citations: such as influence scores of the subjects/authors, expertise of the subjects on the give topic, perspective bias on the subjects of the citations.

Citations: such as text match quality (e.g., content of citations matching search terms), number of citations, date of the citations, and other citations related to the same cited object, time bias, type bias etc.

For a non-limiting example, in the example depicted in FIG. 1, citing subject Author One has an influence score of 10, which composes Citation 1.1 and Citation 1.2, wherein Citation 1.1 cites Target One once while Citation 1.2 cites Target Two twice; citing subject Author Two has an influence score of 5, which composes Citation 2.1, which cites Target One three times; citing subject Author Three has an influence score of 4, which composes Citation 3.2, which cites Target Two four times. Based on the influence scores of the authors alone, object selection engine 206 calculates the influence score of Target One as 10*1+3*5=25, while the influence score of Target Two is calculated as 10*2+4*4=36. Since Target Two has a higher influence score than Target One, it should be ranked higher than Target One in the final search result.

FIG. 3 depicts an example of a flowchart of a process to support determination of quality of cited objects in search results based on the influence of the citing subjects. Although this figure depicts functional steps in a particular order for purposes of Illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where citation searching, retrieving and ranking criteria and mechanisms are set and adjusted based on user specification and/or internal statistical data. The flowchart 300 continues to block 304 where a plurality of citations of objects that fit the search criteria, such as text match, time filter, author filter, type filter, are retrieved. The flowchart 300 continues to block 306 where influence scores of a plurality of subjects that compose the plurality of citations of objects are calculated. The flowchart 300 continues to block 308 where influence scores of objects in the citations from the search are calculated based on the influence scores of the plurality of subjects and the ranking criteria. The flowchart 300 ends at block 310 where objects are selected as the search result based on the matching of the objects with the searching criteria as well as influence scores of the objects.

In some embodiments, object selection engine 206 determines the qualities of the cited objects by examining the distribution of influence scores of subjects citing the objects in the search results. For a non-limiting example, one measure of the influence distribution is the ratio of the number of citations from the "influential" and the "non-influential" subjects, where "influential" subjects may, for a non-limiting example, have an influence score higher than a threshold determined by the percentile distribution of all influence scores. Object selection engine 206 accepts only those objects that show up in the citation search results if their citation ratios from "influential" and "non-influential" subjects are above a certain threshold while others can be marked as spam if the ratio of their citation ratios from "influential" and "non-influential" subjects fall below the certain threshold, indicating that they are most likely cited from spam subjects.

In some embodiments, object selection engine 206 calculates and ranks cited objects by treating citations of the objects as connections having positive or negative weights in a weighted citation graph. A citation with implicit positive weight can include, for a non-limiting example, a retweet or a link between individual blog posts or web cites, while a citation with negative weight can include, for a non-limiting example, a statement by one subject 102 that another source is a spammer.

In some embodiments, object selection engine 206 uses citations with negative weights in a citation graph-based rank/influence calculation approach to propagate negative citation scores through the citation graph. Assigning and propagating citations of negative weights makes it possible to identify dusters of spammers in the citation graph without having each spammer individually identified. Furthermore, identifying subjects/sources 102 with high influence and propagating a few negative citations from such subjects is enough to mark an entire duster of spammers negatively, thus reducing their influence on the search result.

In some embodiments, object selection engine 206 presents the generated search results of cited objects to a user who issues the search request or provides the generated search results to a third party for further processing. In some embodiments, object selection engine 206 presents to the user a score computed from a function combining the count of citations and the influence of the subjects of the citations along with the search result of the objects. In some embodiments, object selection engine 206 displays multiple scores computed from functions combining the counts of subsets of citations and the influence of the source of each citation along with the search result, where each subset may be determined by criteria such as the influence of the subjects, or attributes of the subjects or the citations. For non limiting-examples, the following may be displayed to the user—"5 citations from Twitter; 7 citations from people in Japan; and 8 citations in English from influential users." The subsets above may be selected and/or filtered either by the object selection engine 206 or by users.

In some embodiments, object selection engine 206 selects for display of every object in the search result, one or more citations and the subjects of the citations on the basis of criteria such as the recency or the influence of their citing subjects relative to the other citations in the search result. Object selection engine 206 then displays the selected citations and/or subjects in such a way that the relationship between the search result, the citations and the subjects of the citations are made transparent to a user.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of Integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the Invention and its practical application, thereby enabling others skilled in the relevant art to understand the claimed subject matter, the various embodiments and with various modifications that are suited to the particular use contemplated.

What is claimed is:

1. A system, comprising:
a search engine with one or more processors,
the one or more processors accepting a query from a user as part of a search request;
the one or more processors retrieving a plurality of objects that match the query;
the one or more processors determining a distribution over time of the objects matching the query for a temporality analysis of the query;
the one or more processors analyzing the distribution over time of the objects to provide a classification of the query;
the one or more processors generating a search result including the objects matching the query and the classification of the query;
one or more processors selecting a preferred time window from a set of time windows based on the time distribution of the objects matching the query, the selecting of the preferred time window based on at least a comparison of an actual number of objects matching the query within the time window and an expected number of the objects matching the query within a time window for each time window in the set of time windows and the expected number of objects for this time window is based on a ratio of a number of objects matching the query and a length of the time window, wherein the preferred time window is a time interval that encompasses at least some timestamps associated with the objects;
the one or more processors determining a temporality of the query to generate a search result including a list of objects that are based on objects matching the query and the temporality analysis of the query, where the temporality of the query is a distribution over the preferred time window of the objects matching the query based on timestamp metadata of the objects matching the query; and
the one or more processors ranking the list of objects.

2. The system of claim 1, wherein:
each of the plurality of objects is one of:
Internet web sites, blogs, videos, books, films, music, image, video, documents, data files, objects for sale, objects that are reviewed or recommended or cited, subjects/authors, natural or legal persons, citations, or any entities that are associated with a Uniform Resource Identifier (URI).

3. The system of claim 1, wherein:
the one or more processors provide a discrete classification of the query into various categories.

4. The system of claim 3, wherein:
the one or more processors classify the query with constant or even distribution of the objects over time as for knowledge/canonical.

5. The system of claim 3, wherein:
the one or more processors classify the query with the distribution of the objects concentrated at particular points as focused on a specific event.

6. The system of claim 3, wherein:
the one or more processors classify the query with the distribution of the objects increased over time as reflecting the recent interest of the user.

7. The system of claim 1, wherein:
the one or more processors provide a continuous classification of the query.

8. The system of claim 7, wherein:
the continuous classification of the query is a scalar or vector value resulting from transformations of a chronology histogram of the query, which represents the distribution over time of the objects matching the query.

9. The system of claim 1, wherein:
the one or more processors select a combination of multiple time windows that provides the best search result for the query.

10. The system of claim 1, wherein:
the one or more processors enable a citation centric search process that retrieves a plurality of citations composed by a plurality of subjects citing the plurality of objects.

11. The system of claim 10, wherein:
each of the plurality of subjects has an opinion wherein expression of the opinion is explicit, expressed, implicit, or imputed through any other technique.

12. The system of claim 10, wherein:
each of the plurality of citations includes one or more of:
expression of opinions on the objects, expressions of authors in the form of Tweets, blog posts, reviews of objects on Internet web sites Wikipedia entries, postings to social media, postings to websites, postings in the form of reviews, recommendations, or any other form of citation made to mailing lists, newsgroups, discussion forums, comments to websites or any other form of Internet publication.

13. The system of claim 10, wherein:
the one or more processors accept and enforces a plurality of criteria on citation searching, retrieving and ranking, each of which is either be explicitly described by a user or best guessed by the system based on internal statistical data.

14. The system of claim 13, wherein:
the plurality of criteria include one or more of constraints for the plurality of citations, type of the plurality of objects cited, and ranking bias of the cited objects.

15. The system of claim 10, further comprising:
an object selection engine, with one or more processors, the one or more processors of the object selection engine determining temporalities and classifications of one or more of the citing subjects and the cited objects of the citations in addition to temporality of the query;
the one or more processors of the object selection engine providing the list of selected objects based on one or more of these temporalities and classifications.

16. The system of claim 15, wherein:
the one or more processors of the object selection engine determine the temporality of a subject based on time distribution of the citations from the subject that match the query.

17. The system of claim 15, wherein:
the one or more processors of the object selection engine determine the temporality of a subject based on time distribution of all of the citations from the subject.

18. The system of claim 15, wherein:
the one or more processors of the object selection engine utilizes the temporalities to identify whether the subjects of the citations are either evenly or concentratedly distributed over time.

19. The system of claim 15, wherein:
the one or more processors of the object selection engine classify the subjects either into discrete classification of categories or in continuous classification.

20. The system of claim 15, wherein:
the one or more processors of the object selection engine determine the temporality of an object based on time distribution of the citations for the object that match the query.

21. The system of claim 15, wherein:
the one or more processors of the object selection engine determine the temporality of an object based on time distribution of all of the citations for the object.

22. The system of claim 15, wherein:
the object selection engine utilizes the temporalities to identify whether the objects of the citations are either evenly or concentratedly distributed over time.

23. The system of claim 15, wherein:
the one or more processors of the object selection engine classify the objects either into discrete classification of categories or in continuous classification.

24. The system of claim 15, wherein:
the one or more processors of the object selection engine weigh the time distribution a query, a subject or an object based on attributes associated with each citation, or attributes associated with the subject or object of each citation.

25. The system of claim 24, wherein:
the attributes include one or more of language, location, source, and time of the citation or the subject or object of the citation.

26. The system of claim 15, wherein:
the one or more processors of the object selection engine utilize the classifications of the query, the subject, and/or the object to perform one or more of choosing different forms of displaying the search result to the user, choosing different methods to determine the search result, and as an input to the search result computation.

27. A method, comprising:
using one or more processors to accept a query from a user as part of a search request; using one or more processors to retrieve a plurality of objects that match the query;
using one or more processors to determine distribution over time of the objects matching the query for a temporality analysis of the query;
using one or more processors to analyze the distribution over time of the objects to provide a classification of the query;
the one or more processors generating a search result including the objects matching the query and the classification of the query;
using one or more processors to select a preferred time window from a set of time windows based on the time distribution of the objects matching the query, the selecting of the preferred time window based on at least a comparison of an actual number of objects matching the query within the time window and an expected number of the objects matching the query within a time window for each time window in the set of time windows and the expected number of objects for this time window is based on a ratio of a number of objects matching the query and a length of the time window, wherein the preferred time window is a time interval that encompasses at least some timestamps associated with the objects;
using one or more processors to determine a temporality of the query to generate a search result of a list of objects that are based on objects matching the query and the classification of the query within the preferred time window based on timestamp metadata of the objects matching the query; and
the one or more processors ranking the list of objects.

28. The method of claim 27, further comprising:
using one or more processors to provide a discrete classification of the query into various categories.

29. The method of claim 28, further comprising:
using one or more processors to classify the query with constant or even distribution of the objects over time as for knowledge/canonical.

30. The method of claim 28, further comprising:
using one or more processors to classify the query with the distribution of the objects concentrated at particular points as focused on a specific event.

31. The method of claim 28, further comprising:
using one or more processors to classify the query with the distribution of the objects increased over time as reflecting the recent interest of the user.

32. The method of claim 27, further comprising:
using one or more processors to provide a continuous classification of the query.

33. The method of claim 27, further comprising:
using one or more processors to select a combination of multiple time windows that provides the best search result for the query.

34. The method of claim 27, further comprising:
using one or more processors to enable a citation centric search process that retrieves a plurality of citations composed by a plurality of subjects citing the plurality of objects.

35. The method of claim 34, further comprising:
using one or more processors to accept and enforce a plurality of criteria on citation searching, retrieving and ranking, each of which is either be explicitly described by a user or best guessed by the system based on internal statistical data.

36. The method of claim 34, further comprising:
using one or more processors to determine temporalities and classifications of one or more of the citing subjects and the cited objects of the citations in addition to temporality of the query;
using one or more processors to provide the list of selected objects based on one or more of these temporalities and classifications.

37. The method of claim 36, further comprising:
using one or more processors to determine the temporality of a subject based on time distribution of the citations from the subject that match the query.

38. The method of claim 36, further comprising:
using one or more processors to determine the temporality of a subject based on time distribution of all of the citations from the subject.

39. The method of claim 36, further comprising:
using one or more processors to utilize the temporalities to identify whether the subjects of the citations are either evenly or concentratedly distributed over time.

40. The method of claim 36, further comprising:
using one or more processors to classify the subjects either into discrete classification of categories or in continuous classification.

41. The method of claim 36, further comprising:
using one or more processors to determine the temporality of an object based on time distribution of the citations for the object that match the query.

42. The method of claim 36, further comprising:
using one or more processors to determine the temporality of an object based on time distribution of all of the citations for the object.

43. The method of claim 36, further comprising:
using one or more processors to utilize the temporalities to identify whether the objects of the citations are either evenly or concentratedly distributed over time.

44. The method of claim 36, further comprising:
using one or more processors to classify the objects either into discrete classification of categories or in continuous classification.

45. The method of claim 36, further comprising:
using one or more processors to weigh the time distribution a query, a subject or an object based on attributes associated with each citation, or attributes associated with the subject or object of each citation.

46. The method of claim 36, further comprising:
using one or more processors to utilize the classifications of the query, the subject, and/or the object to perform one or more of choosing different forms of displaying the search result to the user, choosing different methods to determine the search result, and as an input to the search result computation.

47. A non-transitory machine readable medium having software instructions stored thereon that when executed cause a system to:
accept a query from a user as part of a search request;
retrieve a plurality of objects that match the query;
determine a distribution over time of the objects matching the query for temporality analysis of the query;
analyze the distribution over time of the objects to provide a classification of the query;
generate a search result including the objects that are not only based on matching of the objects to the query but also based on the classification of the query;
select a preferred time window based on the time distribution of the objects matching the query, the selection of the preferred time window based on at least a comparison of an actual number of objects matching the query within the time window and an expected number of the objects matching the query within a time window for each time window in the set of time windows and the expected number of objects for this time window is based on a ratio of a number of objects matching the query and a length of the time window, wherein the preferred time window is a time interval that encompasses at least some timestamps associated with the objects;
determine a temporality of the query to generate a search result of a list of objects that are based on objects matching the query and the classification of the query within the preferred time window based on timestamp metadata of the objects matching the query; and
rank the list of objects.

48. The system of claim 1, wherein the time window is selected from the group consisting of an hour, a day, a week, and a month.

49. The method of claim 27, wherein the time window is selected from the group consisting of an hour, a day, a week, and a month.

50. The machine readable medium of claim 47, wherein the time window is selected from the group consisting of an hour, a day, a week, and a month.

51. The system of claim 1, wherein one time window from the set of time windows is encompassed by another one of the set of time windows.

52. The method of claim 27, wherein one time window from the set of time windows is encompassed by another one of the set of time windows.

53. The machine readable medium of claim 47, wherein one time window from the set of time windows is encompassed by another one of the set of time windows.

* * * * *